(12) United States Patent
Hall et al.

(10) Patent No.: US 12,401,207 B2
(45) Date of Patent: Aug. 26, 2025

(54) ENERGY STORAGE SYSTEM AND METHOD EMPLOYING SECOND-LIFE ELECTRIC VEHICLE BATTERIES

(71) Applicant: B2U Storage Solutions Inc., Santa Monica, CA (US)

(72) Inventors: Freeman Stoflet Hall, Santa Monica, CA (US); Edward Adolph Becker, Champaign, IL (US); Michael Joseph Stern, Westlake Village, CA (US)

(73) Assignee: B2U Storage Solutions Inc., Santa Monica, CA (US)

( * ) Notice: Subject to any disclaimer, the term of this patent is extended or adjusted under 35 U.S.C. 154(b) by 730 days.

(21) Appl. No.: 17/675,456

(22) Filed: Feb. 18, 2022

(65) Prior Publication Data

US 2022/0209546 A1 Jun. 30, 2022

Related U.S. Application Data

(63) Continuation-in-part of application No. 17/382,933, filed on Jul. 22, 2021, now Pat. No. 11,289,921,
(Continued)

(51) Int. Cl.
*H02J 7/00* (2006.01)
*B60L 50/60* (2019.01)
(Continued)

(52) U.S. Cl.
CPC ............ *H02J 7/0024* (2013.01); *B60L 50/66* (2019.02); *B60L 53/30* (2019.02); *B60L 53/60* (2019.02);
(Continued)

(58) Field of Classification Search
CPC .................................................. H02J 7/0024
(Continued)

(56) References Cited

U.S. PATENT DOCUMENTS 7,547,980 B2  6/2009 Harrison
7,710,073 B2  5/2010 Yamauchi et al.
(Continued)

FOREIGN PATENT DOCUMENTS

CN  107305972 A  10/2017
JP  2007141464 A  6/2007
(Continued)

OTHER PUBLICATIONS

Notification of Transmittal of the International Search Report (Forms PCT/ISA/220 and PCT/ISA/210) and the Written Opinion of the International Searching Authority (Form PCT/ISA/237) issued May 2, 2022, by the International Application Division Korean Intellectual Property Office in corresponding International Application No. PCT/US2022/011411. (10 pages).
(Continued)

*Primary Examiner* — Jerry D Robbins
(74) *Attorney, Agent, or Firm* — Panitch Schwarze Belisario & Nadel LLP

(57) ABSTRACT

An energy storage system and method employing second-life electric vehicle batteries. The system includes a plurality of electric vehicle battery packs; and a processor configured to: couple the plurality of electric vehicle battery packs in a series/parallel arrangement, the series/parallel arrangement including a plurality of series strings of electric vehicle battery packs, each of the plurality of series strings of electric vehicle battery packs includes at least two of the plurality of electric vehicle battery packs coupled in series, and the plurality of series strings are connected in parallel; and wherein the coupling of the plurality of electric vehicle battery packs includes one or more of connecting electric vehicle battery packs with lower voltages in series, connecting electric vehicle battery packs with higher voltages in series, connecting electric vehicle battery packs with major-
(Continued)

ity voltages in series, and connecting electric vehicle battery packs within a programmed voltage connection window in parallel.

20 Claims, 10 Drawing Sheets

Related U.S. Application Data which is a continuation of application No. 17/118,497, filed on Dec. 10, 2020, now abandoned.

(51) Int. Cl.
  *B60L 53/30* (2019.01)
  *B60L 53/60* (2019.01)
  *B60L 53/80* (2019.01)

(52) U.S. Cl.
  CPC .......... *B60L 53/80* (2019.02); *H02J 7/00032* (2020.01); *H02J 7/0014* (2013.01); *H02J 7/00304* (2020.01); *B60L 2210/10* (2013.01); *B60L 2210/30* (2013.01); *B60L 2210/40* (2013.01); *H02J 2207/20* (2020.01)

(58) Field of Classification Search
  USPC .......................................................... 320/109
  See application file for complete search history.

(56) References Cited

U.S. PATENT DOCUMENTS

| | | | |
|---|---|---|---|
| 8,838,313 | B2 | 9/2014 | Bolenbaugh |
| 9,347,996 | B2 | 5/2016 | Uchida et al. |
| 9,431,832 | B2 | 8/2016 | Ichikawa et al. |
| 10,183,583 | B2 | 1/2019 | Narla |
| 10,411,500 | B2 | 9/2019 | Qin et al. |
| 10,752,128 | B1 | 8/2020 | Langton et al. |
| 10,759,287 | B2 | 9/2020 | Vahedi et al. |
| 10,759,289 | B2 | 9/2020 | Gou |
| 10,763,692 | B2 | 9/2020 | Pelletier et al. |
| 10,784,702 | B2 | 9/2020 | Kudo et al. |
| 10,926,644 | B1 * | 2/2021 | Willson .................. H02J 7/342 |
| 2007/0187957 | A1 | 8/2007 | Harrison |
| 2012/0133337 | A1 * | 5/2012 | Rombouts ............. G07F 15/006 320/155 |
| 2013/0090872 | A1 * | 4/2013 | Kurimoto ............... B60L 58/13 702/63 |
| 2014/0012443 | A1 | 1/2014 | Bolenbaugh |
| 2014/0015532 | A1 | 1/2014 | Uchida et al. |
| 2014/0184142 | A1 | 7/2014 | Bito |
| 2015/0093611 | A1 * | 4/2015 | Obata ................... G01R 31/392 429/61 |
| 2016/0178678 | A1 | 6/2016 | Pelletier et al. |
| 2016/0185246 | A1 | 6/2016 | Paul |
| 2016/0240898 | A1 * | 8/2016 | Koba ........................ B60L 50/64 |
| 2016/0294022 | A1 | 10/2016 | Thramann et al. |
| 2017/0301961 | A1 * | 10/2017 | Kim .................... H01M 50/522 |
| 2017/0338519 | A1 | 11/2017 | Junger et al. |
| 2017/0361717 | A1 | 12/2017 | Qin et al. |
| 2018/0170201 | A1 | 6/2018 | Miller et al. |
| 2019/0135116 | A1 | 5/2019 | Narla |
| 2019/0168630 | A1 | 6/2019 | Mrlik et al. |
| 2019/0207269 | A1 * | 7/2019 | Junger .............. H01M 10/4207 |
| 2020/0055405 | A1 | 2/2020 | Duan et al. |
| 2020/0067319 | A1 | 2/2020 | Qin et al. |
| 2020/0231064 | A1 * | 7/2020 | Zhao ....................... B60L 50/64 |
| 2020/0313249 | A1 * | 10/2020 | Zhao ..................... H01M 10/48 |
| 2021/0008995 | A1 | 1/2021 | Lee et al. |
| 2021/0265710 | A1 | 8/2021 | Muenzel et al. |
| 2021/0313630 | A1 * | 10/2021 | Zeiler ................. H01M 10/482 |
| 2022/0032806 | A1 * | 2/2022 | Christensen ............ B60L 53/62 |
| 2023/0101550 | A1 * | 3/2023 | Bentzion ................. B60L 50/60 320/109 |
| 2023/0139770 | A1 * | 5/2023 | Burchardt ........... H01M 10/425 429/50 |
| 2023/0402667 | A1 * | 12/2023 | Warren ................ G01R 31/392 |

FOREIGN PATENT DOCUMENTS

| | | | |
|---|---|---|---|
| JP | 2013103723 A | 5/2013 | |
| JP | 2017168244 A | 9/2017 | |
| WO | 2006079202 A1 | 8/2006 | |
| WO | 2018158453 A1 | 9/2018 | |
| WO | WO-2020051483 A1 * | 3/2020 | ............. B60L 50/64 |
| WO | 2020077126 A1 | 4/2020 | |
| WO | 2021014363 A1 | 1/2021 | |
| WO | 2021019444 A1 | 2/2021 | |
| WO | 2022006159 A1 | 1/2022 | |

OTHER PUBLICATIONS

Bauer, Michaela et al, "Evaluating frequency regulation operated on two stationary energy systems with batteries from electric vehicles", Science Direct, Energy Procedia 155, 2018, pp. 32-43.

Ahmadi, Leila et al, "A cascaded life cycle: reuse of electric vehicle lithium-ion battery packs in energy storage systems", Int J Life Cycle Assess, Sep. 7, 2015, pp. 111-124.

Williams, Dexter M.T. J. et al, "Repurposing Used Electric Vehicle Batteries for Energy Storage of Renewable Energy in the Power System", University of Manitoba, Manitoba HVDC Research Centre, 2012 25th IEEE Canadian Conference on Electrical and Computer Engineering (CCECE), 6 pages.

Extended European Search Report, issued on Nov. 19, 2024, in corresponding European Application No. 22729018.6-1002, 10 pages.

Communication pursuant to Rules 70(2) and 70a(2) EPC, issued Dec. 6, 2024, in corresponding European Application No. 22729018. 6-1002, 1 page.

Notice of Reasons for Refusal, issued Jul. 9, 2024, in corresponding Japanese Application No. 2023-560256, 11 pages.

Communication pursuant to Rules 161(2) and 162 EPC,I issued Sep. 25, 2024, in corresponding European Application No. 23756911. 6-1009, 3 pages.

International Preliminary Report on Patentability, issued Aug. 20, 2024, in corresponding International Application No. PCT/US2023/013297, 5 pages.

* cited by examiner

900

910 — coupling a plurality of electric vehicle battery packs in a series/parallel arrangement, the series/parallel arrangement including a plurality of series strings of electric vehicle battery packs, each of the plurality of series strings of electric vehicle battery packs includes at least two of the plurality of electric vehicle battery packs coupled in series, and wherein the plurality of series strings of electric vehicle battery packs are connected in parallel

920 — wherein the coupling of the plurality of electric vehicle battery packs comprises one or more of connecting electric vehicle battery packs with lower voltages in series, connecting electric vehicle battery packs with higher voltages in series, connecting electric vehicle battery packs with majority voltages in series, and connecting electric vehicle battery packs within a programmed voltage connection window in parallel

FIGURE 9

ENERGY STORAGE SYSTEM AND METHOD EMPLOYING SECOND-LIFE ELECTRIC VEHICLE BATTERIES

CROSS-REFERENCES TO RELATED APPLICATIONS

This application is a continuation-in-part of U.S. application Ser. No. 17/382,933 filed on Jul. 22, 2021, which is a continuation of U.S. application Ser. No. 17/118,497 filed on Dec. 10, 2020, which are both incorporated herein by reference in their entirety.

TECHNICAL FIELD

The present disclosure generally relates to an energy storage system and method employing second-life electric vehicle batteries, and more particularly to an integrated battery energy storage system, which includes a plurality of electric vehicle battery packs coupled in a series/parallel arrangement and maximizing yields from the plurality of electric vehicle battery packs with varying states of health (SOH).

BACKGROUND

Reducing the cost of energy storage systems (ESS) is an important objective for electricity ratepayers and policymakers. A primary metric to measure ESS cost is the levelized cost of storage (LCOS), defined as the total lifetime cost of the ESS, including capital costs to construct as well as costs to operate, divided by the cumulative delivered electricity that the system has stored.

Repurposing electrochemical batteries from electric vehicles (EV) for a second use or second-life stationary storage application can significantly reduce the LCOS of ESS compared to using new batteries. Deploying EV batteries in stationary storage applications is the highest and best use of batteries when the batteries are no longer suitable for use in EVs. This in turn, allows a 2nd life battery pack to return many times more than its initial investment before being broken down for component recycling. Larger scale ESS requires a large number of batteries to be deployed in series and parallel electrical configurations to deliver energy at high voltage and current levels. Whether electrically connected in front of or behind a customer's meter, an ESS must efficiently integrate and manage batteries over time and charge/discharge cycles to be effective.

SUMMARY

It would be desirable to have a system that utilizes a plurality of electric vehicle (EV) batteries in second-life stationary storage applications within an overall energy storage system (ESS).

In accordance with an aspect, an integrated battery energy storage system is disclosed, the integrated battery energy system comprising: a plurality of electric vehicle battery packs; and a computer system, the computer system including a processor configured to: couple the plurality of electric vehicle battery packs in a series/parallel arrangement, the series/parallel arrangement including a plurality of series strings of electric vehicle battery packs, each of the plurality of series strings of electric vehicle battery packs includes at least two of the plurality of electric vehicle battery packs coupled in series, and wherein the plurality of series strings of electric vehicle battery packs are connected in parallel; and wherein the coupling of the plurality of electric vehicle battery packs includes one or more of connecting electric vehicle battery packs with lower voltages in series, connecting electric vehicle battery packs with higher voltages in series, connecting electric vehicle battery packs with majority voltages in series, and connecting electric vehicle battery packs within a programmed voltage connection window in parallel.

In accordance with another aspect, a method is disclosed for integrating electric vehicle battery packs into an integrated battery energy storage system, the method comprising: coupling a plurality of electric vehicle battery packs in a series/parallel arrangement, the series/parallel arrangement including a plurality of series strings of electric vehicle battery packs, each of the plurality of series strings of electric vehicle battery packs includes at least two of the plurality of electric vehicle battery packs coupled in series, and wherein the plurality of series strings of electric vehicle battery packs are connected in parallel; and wherein the coupling of the plurality of electric vehicle battery packs comprises one or more of connecting electric vehicle battery packs with lower voltages in series, connecting electric vehicle battery packs with higher voltages in series, connecting electric vehicle battery packs with majority voltages in series, and connecting electric vehicle battery packs within a programmed voltage connection window in parallel.

BRIEF DESCRIPTION OF THE DRAWINGS

FIG. 9 illustrates a method for integrating electric vehicle battery packs into an integrated battery energy storage system.

DETAILED DESCRIPTION

Figure 1:
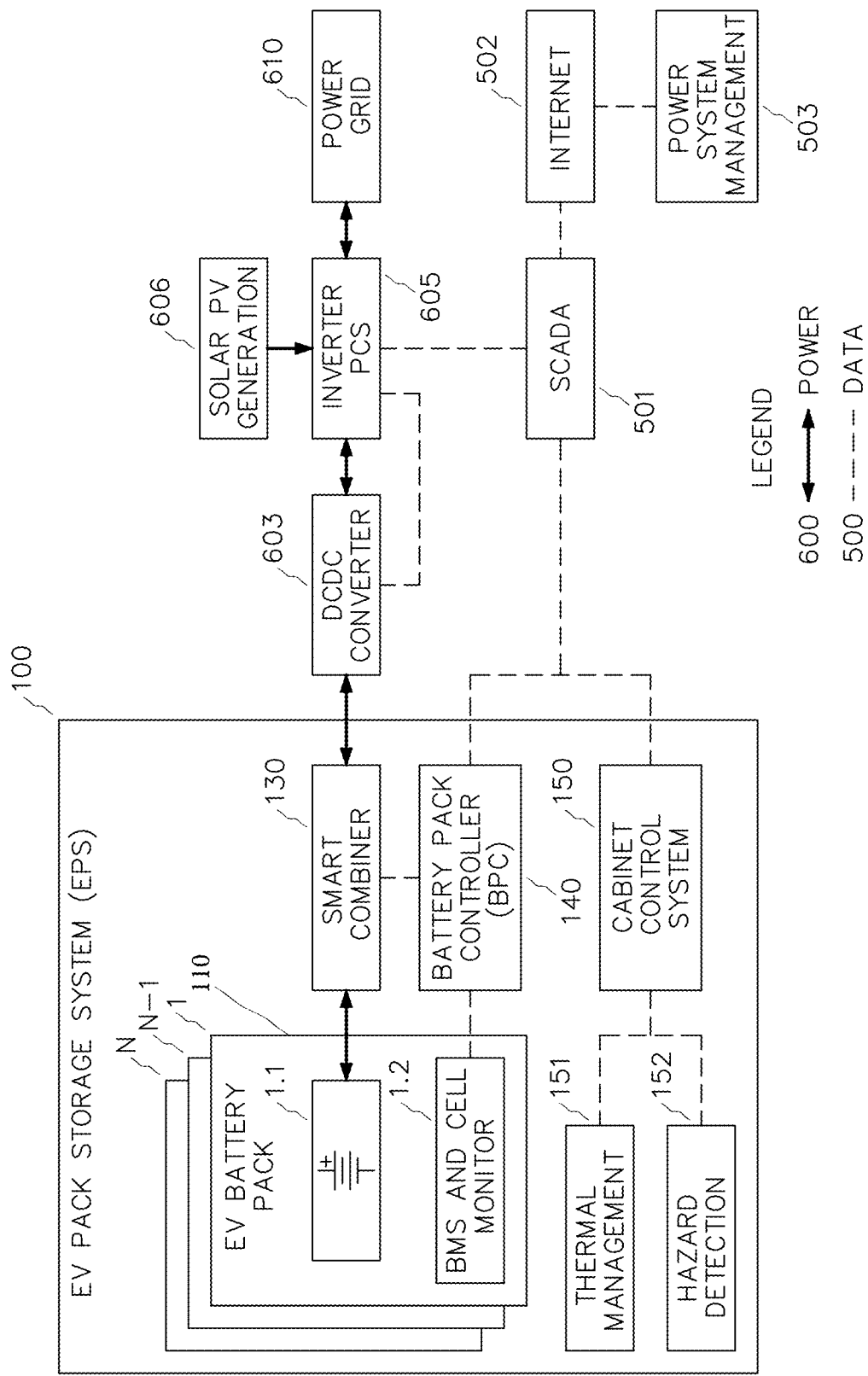
FIG. 1 is a block diagram illustrating the utility as part of an energy storage system in accordance with an exemplary embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

In accordance with an aspect, an EV pack storage system (EPS) employs the EV battery packs as an integrated functional unit or building block wherein a plurality of EV battery packs are rather easily aggregated to behave as a larger battery within an ESS. The batteries can be racked in a specialized environmentally controlled enclosure in the original pack casing in which the batteries were mounted in the EV. The specialized environmentally controlled enclosure functions as an integrated EV pack storage unit and the EPS functions as a sub-system building block within the overall ESS. The EV battery packs within the EPS may be electrically connected in series as well as in parallel. Each series and parallel string are protected with an overcurrent device. The EPS enclosure is designed for easy installation, removal and replacement of EV battery packs. Each battery pack and string may be monitored with a proprietary battery pack controller (BPC). The BPC helps ensure proper operating parameters and monitors the health of each EV battery pack. The battery pack controller (BPC) can monitor the health of each EV battery pack by interfacing with the EV pack integrated battery management system (BMS). The BPC manages a smart combiner (SC) to actively or passively balance the second-life batteries in order to effectively utilize the charge and discharge cycle of individual packs adjusting for variance in each pack's capacity. The environment of the EPS enclosure is managed to maintain suitable operating temperatures, and for hazard detection. The EPS operates within a larger ESS that also includes a Power Conversion System (PCS) and Supervisory Control and Data Acquisition (SCADA) system. Multiple EPS can operate in integrated fashion together within an ESS. The ESS can be configured as DC-coupled, or AC-coupled to the inverter. The EPS can be charged from on-site generation such as solar or wind, or from electricity provided by the AC power system, for example, a power grid. The EPS within the ESS can be deployed in front of the meter (IFM) directly interconnected to the power grid or deployed behind the meter (BTM) to offset a customer's load and demand.

In accordance with an exemplary embodiment, an integrated system is disclosed for deploying a plurality of second-life electric vehicle (EV) battery packs within an energy storage system (ESS).

In the present disclosure, herein referred to as the EV pack storage system (EPS), is an integrated functional building block wherein a number of EV battery packs are easily aggregated to behave as a larger battery within an overall ESS. The EPS composition and function can include: (1) the EV battery packs are utilized, both mechanically and electrically, as they were in the original first-life vehicle application, incorporating the battery pack's battery management system (BMS) as well as a similar digital serial data link format and protocol; (2) the EV battery packs are electrically configured in a parallel arrangement and often in series. EV battery packs may not have been originally designed for use in series and/or parallel connection but this limitation is overcome with a unique design for mounting, communicating and interconnecting; (3) a number of EV battery packs are integrated into an environmentally controlled and monitored cabinet or enclosure which is not considered an occupiable space according to building or fire code definitions, and where a single enclosure, or multiple enclosures, can be integrated in the ESS; (4) a battery pack controller (BPC) is deployed as part of the EPS to integrate the communications and controls necessary for the batteries to work together and operate in coordination as a unified functional block; and (5) a smart circuit combiner provides electrical balancing and overcurrent protection for all EV battery packs within the EPS.

FIG. 1 is a block diagram illustrating the utility of the disclosure in a preferred embodiment as part of a grid-tied energy storage system. In accordance with an exemplary embodiment, the EV pack storage system (EPS) 100 can be implemented as part of an overall energy storage system (ESS). All heavy lines 600 with arrowheads indicate power connections and possible power flow directions. All dashed lines 500 indicate bidirectional digital data bus connections.

EPS 100 includes a plurality of EV battery packs 110, designated in FIG. 1 as blocks 1, N–1 and N to indicate any number N of identical EV battery packs. EV battery pack 1 contains batteries 1.1 and Battery Management System (BMS) 1.2. The EV battery pack batteries 1.1 through N.1 are connected in series at nominal voltages, which are multiples of a single pack's nominal voltage. A number N of EV battery packs 110 are connected in a series/parallel configuration or otherwise aggregated within smart combiner 130 to electrically behave as a larger battery within the overall energy storage system. A smart combiner 130 is connected to a bidirectional DCDC (DC-to-DC) converter 603. A DCDC converter 603 can provide an optimum voltage match between the aggregate EV battery packs and the Inverter Power Conversion System (PCS) 605 to provide an optimum voltage match as the maximum power point of solar PV generation 606 changes with temperature and load. A smart combiner (SC) 130 can be used to actively balance the second-life batteries in order to effectively utilize the charge and discharge cycle of individual packs adjusting for variance in each pack's capacity.

When the overall system is delivering energy stored in the EV battery packs, for example, to a power grid 610, DC power flows from the EV battery packs, through smart combiner 130 and through DCDC converter 603. DC power is then converted to AC power by inverter PCS 605 to supply energy to the power grid 610. Power from solar photovoltaic generation 606, when available, can also flows through PCS 605, which functions as a DC to AC power converter to discharge power into power grid 610. In this configuration, the total power into power grid 610 can be, for example, a combination of battery sourced power and solar photovoltaic sourced power.

In accordance with an exemplary embodiment, when the overall system is delivering energy to charge EV battery packs 1 through N, PCS 605 functions as an AC to DC power converter by sourcing AC power from power grid 610 and converting it to DC power. This DC power flows through DCDC converter 603, through smart combiner 130 and into all EV battery packs 1 through N. Power from solar photovoltaic generation 606, when available, can either be used to reduce the power required from power grid 610 to charge EV battery packs 1 through N or if the power from available solar power generation 606 is greater than the power required to charge these EV battery packs, then the excess power can be delivered to power grid 610. Some system variants will not include solar PV onsite generation 606 and therefore DCDC converter 603 may not be required.

In accordance with an exemplary embodiment, a battery management system (BMS) 1.2 monitors every cell in the EV battery pack 1, primarily to check for mismatched, undercharged or overcharged cells in a series string. In addition the BMS can also monitor pack voltage, current and temperature. By monitoring and rebalancing mismatched cells, limiting current, voltage and temperature, the usable lifetime of the EV battery pack can be enhanced, and battery cell and pack safe operating parameters can be ensured to avoid hazardous conditions. A Battery Pack Controller (BPC) 140 communicates with individual EV battery packs 1 through N over a digital data bus. Supervisory Control and Data Acquisition (SCADA) 501 communicates with BPC 140 to ascertain the state of charge, state of health and overall availability of the aggregate EV battery packs. In accordance with an exemplary embodiment, SCADA 501 receives top level commands from power system manager 503 via internet 502 to control the operation of the overall energy storage system (EPS) 100, 200, 300, 400 (FIG. 2).

SCADA 501 can also communicate with a cabinet control system 150. Within EPS 100, the cabinet control system 150 can communicate with thermal management block 151 and the hazard protection block 152. Thermal management block 151 provides air conditioning, dehumidification, venting, and air circulation as required to maintain an optimum environment for EV battery packs 1 through N. The hazard detection block 152 monitors the environment inside the EPS 100 enclosure, for example, for smoke and over/under temperature conditions.

Figure 2:
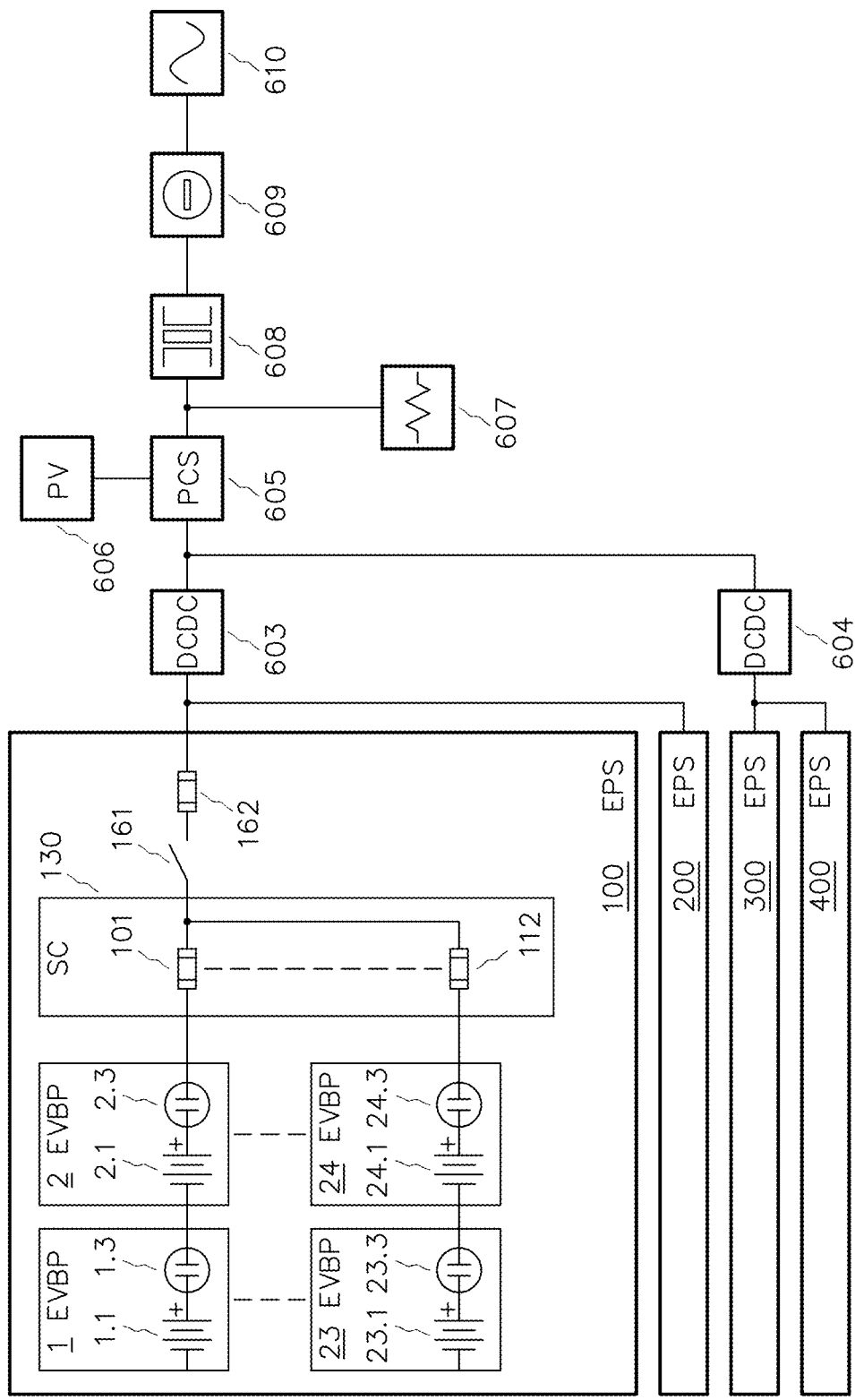
FIG. 2 is a modified electrical single-line schematic diagram of an energy storage system in accordance with an exemplary embodiment.

FIG. 2 is a modified single-line electrical diagram of an energy storage system in accordance with an exemplary embodiment and illustrates the power flow. This disclosure and description does not limit, however, the scope of the disclosure to systems with the number of elements and/or components described herein.

As illustrated in FIG. 2, the energy storage system, for example, has four EV pack storage assemblies (EPS) 100, 200, 300 and 400. Each EPS 100, 200, 300, 400, can be identical. However, each EPS may not be identical and modifications of one or more the EPSs 100, 200, 300, 400 may occur. In accordance with an exemplary embodiment, the EPS 100 contains 24 EV battery packs (EVBP) designated 1-24. Within each EVBP are a number of series or series parallel connected battery modules shown as 1.1 in EVBP 1 through 24.1 in EVBP 24. There are also a normally open contactors, which may be configured as one or more series connected contactors designated, 1.3 in EVBP 1 through 24.3 in EVBP 24. EVBP 1-24 may also contain other power circuits, such as but not limited to pre-charge resistors, relays and fuses. In this exemplary system, EVBP 1 through 24 are connected in a 2S12P circuit arrangement where EVBP pairs are connected in series and where 12 of these series strings are connected in parallel. The series strings pairs are 1/2, 3/4, 5/6, 7/8, 9/10, 11/12, 13/14, 15/16, 17/18, 19/20, 21/22, and 23/24. Each of the 12 series strings 1/2 through 23/24 are connected through fuses 101 through 112, respectively, in smart combiner 130. Fuses 101 through 112 provide a second tier of overcurrent protection to protect the EV batteries 1.1 through 24.1 from over-currents under abnormal conditions. Fuses 101 through 112 can also prevent contactors 1.3 through 24.3 from breaking currents outside safe contactor limits. Contactors 1.3 through 24.3 can provide the first tier of overcurrent protection, for currents less than fuse 101 through 112 ratings, as well as other circuit isolation and connection control functions. The output of smart combiner (SC) 130 is connected to switch 161, which connects or isolates the power circuits of EPS 100 from the other energy storage system components. Fuse 162 protects the ampacity of conductors and the break capability of switch 161. In accordance with an exemplary embodiment, circuit breakers or other overcurrent devices and systems may be substituted for fuses in FIG. 2.

In this system example, EPS 100 and 200 are connected to DCDC converter 603. EPS 300 and 400 are connected to DCDC converter 604. DCDC converter 603 can provide an optimum voltage match between parallel connected EPS 100 and EPS 200 and the inverter power conversion system (PCS) 605 to provide an optimum voltage match as the maximum power point of solar PV generation 606 changes with temperature and irradiance. Both DCDC converters 603 and 604 are capable of bidirectional power transfer, to either charge or discharge EV battery packs. PCS 605 is also bidirectional with respect to power flow.

When the overall system, for example, is delivering energy stored in EPS 100, 200, 300 and 400 batteries to power grid 610 and/or local loads 607, DC power flows from EPS 100 and 200 through DCDC converter 603 and in parallel from EPS 300 and 400 through DCDC power converter 604. DC power can then be converted to AC power by PCS 605. AC power then flows through distribution transformer 608, where the voltage can be raised to more efficient distribution voltage levels and through revenue meter 609 before connection to power grid 610. Power from solar photovoltaic generation 606, when available and utilized, also flows through PCS 605 and PCS 605 functions as a DC to AC power converter to source power into power grid 610 and/or local loads 607. The total power into power grid 610 can be the sum of battery sourced power plus solar photovoltaic sourced power minus the power used by local loads 607. Local loads may also be supported without a connection to power grid 610 in which case PCS 605 works in a "stand alone" AC voltage regulation mode.

When the overall energy storage system is delivering energy to charge EV battery packs in EPS 100, 200, 300 and 400, PCS 605 functions as an AC to DC power converter by sourcing AC power from power grid 610 and converting AC to DC power. In accordance with an exemplary embodiment, the DC power flows through DCDC converters 603 and 604 to charge EV battery packs in EPS 100, 200, 300 and 400. Power from solar photovoltaic generation 606, when available, for example, can either be used to reduce the power required from the power grid 610 to charge EV battery packs, or if the power available from solar power generation 606 is greater than the power required to charge these EV battery packs and supply local "behind the meter" loads 607, then the excess power can be delivered to power grid 610.

In accordance with an alternate embodiment as shown in FIG. 2, the energy storage system can include one or more of the following: PCS 605, DCDC converter 603, transformer 608 and power meter 609, as part of the integrated EPS 100.

Figure 3:
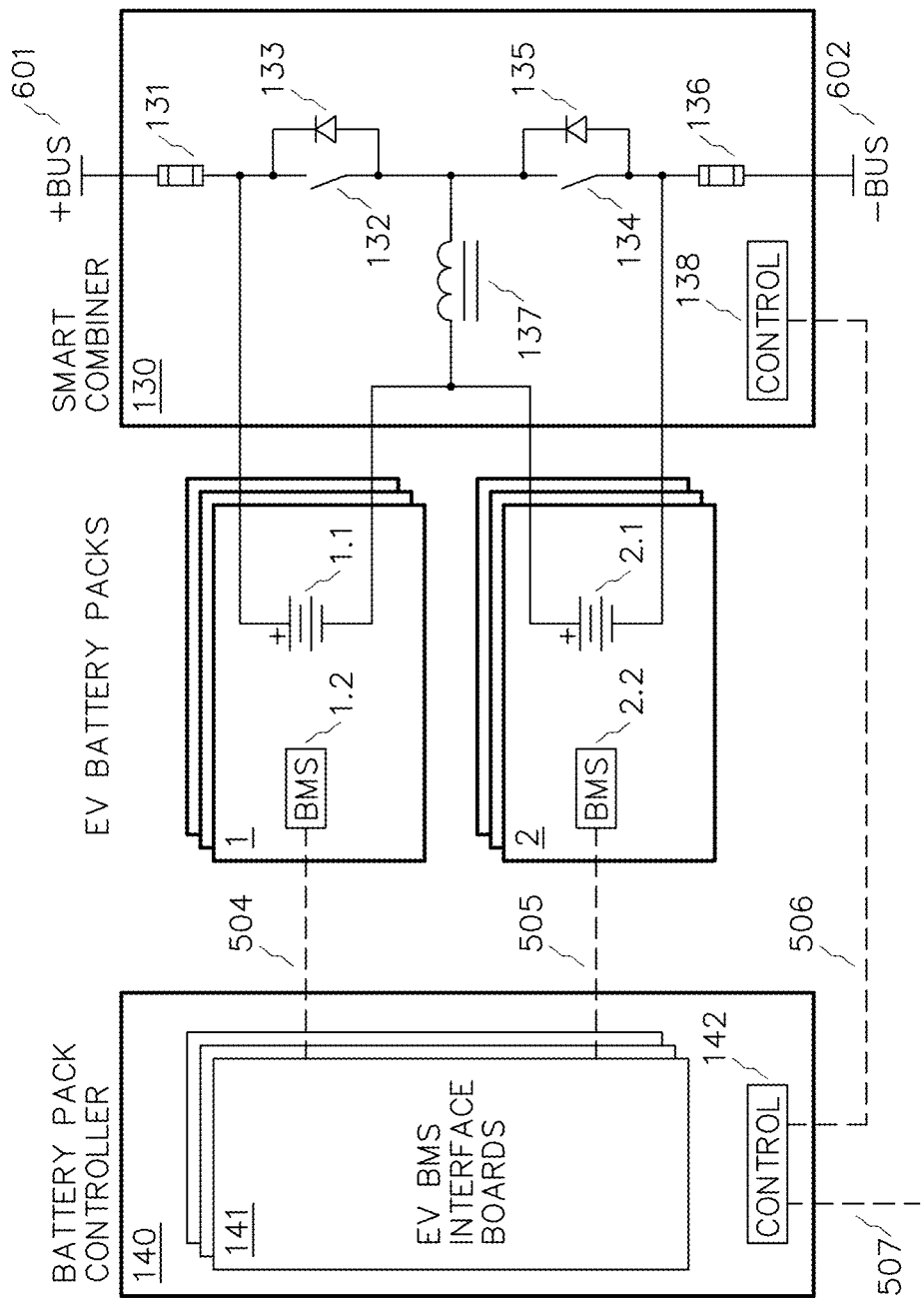
FIG. 3 illustrates a battery pack controller (BPC) and smart combiner (SC), with active balancer in accordance with an exemplary embodiment.

FIG. 3 is a detailed drawing of the battery pack controller (BPC) 140 and smart combiner 130 as shown in FIG. 1. Reference designator 1 indicates a plurality of EV battery packs (EVBP) with EVBP 1 on top. Reference designator 2 indicates a plurality EVBP with EVBP 2 on top. EVBP 1 and 2 are electrically connected in series as the first series pair in this EPS embodiment. Each series pair within the EPS communicates with one EV BMS interface board (EVIB) within in the BPC 140. In this first, top level case, BMS 1.2 and BMS 2.2 communicate with EVIB 141 over digital data buses 504 and 505, respectively. The communication protocol is the same as used in the original manufacturer's electric vehicle application. In most instances, but not limited to controller area network bus (CAN bus). All other EVBP series pairs within the EPS communicate in a similar way. Control circuit 142 aggregates the data from all EVIB within BPC 140 and provides a Modbus digital communication link 507 to a system controller external to the EPS and Modbus link 506 to smart combiner 130. In accordance with an exemplary embodiment, the Modbus digital communication link 507 communicates with the overall energy system SCADA (element 501 in FIG. 1) to report the voltage, current, health, availability and state of charge of the "composite" battery configured from the series/parallel connection of all EV battery packs. Modbus data link 506 connects control circuit 142 to control circuit 138 to actively control the balancing of each EV battery pack in a series string.

In accordance with an exemplary embodiment, the balancing of each EV battery pack in a series string, for example, can be achieved by monitoring the voltage, current and temperature of each EV battery pack and then transferring energy from the higher voltage of the two packs in a series string to the lower voltage pack. Using the example shown in FIG. 3, if EVBP 1 has a higher voltage than EVBP 2, then semiconductor switch 132 is closed, current flows from battery 1.1 through inductor 137, semiconductor switch 132 is opened and the current through inductor 137 flows through diode 135 and into battery 2.1 completing one energy transfer cycle. This energy transfer cycle is repeated at high frequencies for an amount of time proportional to the desired energy transfer. If EVBP 2 has a higher voltage than EVBP 1, then semiconductor switch 134 is closed, current flows from battery 2.1 through inductor 137, semiconductor switch 134 is opened and the current through inductor 137 flows through diode 133 and into battery 1.1 completing one energy transfer cycle.

FIG. 3 illustrates a method of balancing batteries in a series battery string but does not limit the disclosure to any one battery balancing method or number of EVBPs in a series string. In accordance with an exemplary embodiment, the energy storage system includes the interconnections and inter-functionality of the battery pack controller (BPC) 140, EV battery pack battery management systems, 1.2 and 2.2 in this example, smart combiner 130 and overall system controller via data link 507. Fuses 131 and 136 can be used to provide fault isolation between EVBP 1 and 2 series string and the parallel circuits of all series strings +BUS 601 and −BUS 602. In accordance with an exemplary embodiment, all other series strings, for example, can be protected in a similar manner.

Figure 4:
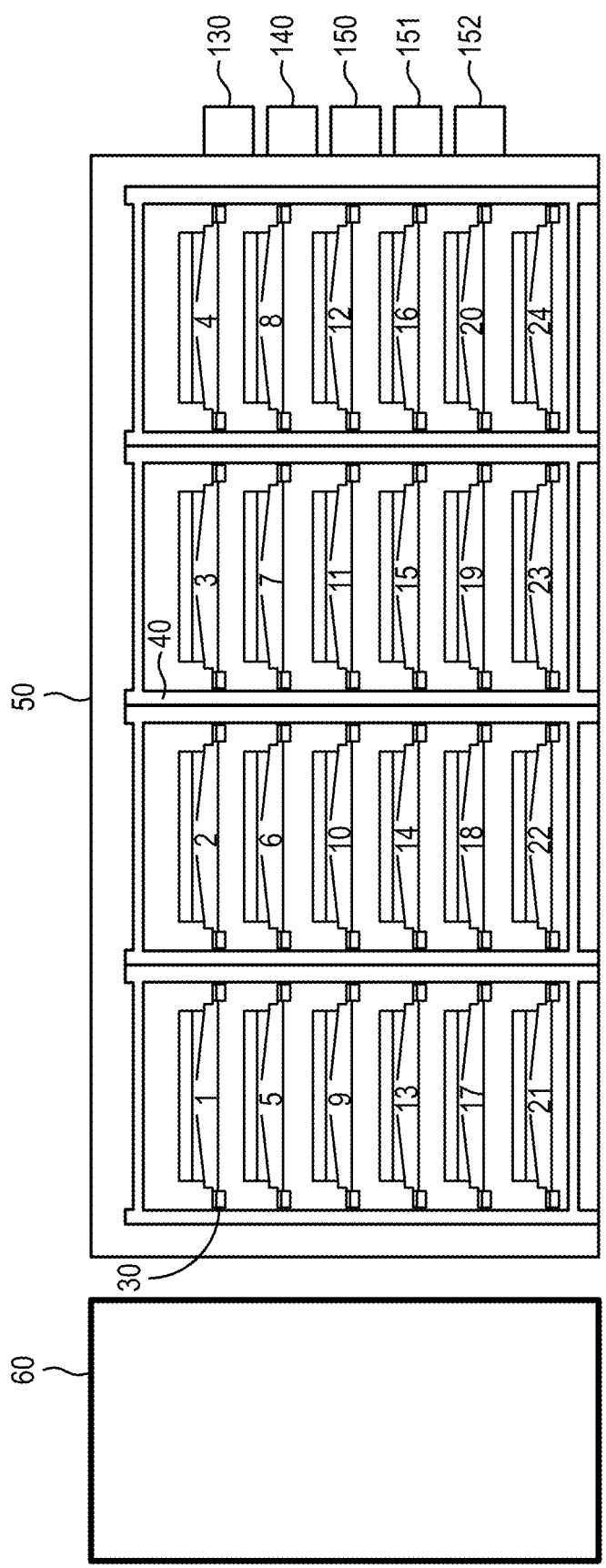
FIG. 4 illustrates the mechanical layout of an enclosure component in accordance with an exemplary embodiment.

In accordance with an exemplary embodiment, the energy storage system can include each of the elements shown in FIG. 1 within EV pack storage system (EPS) 100 plus a weatherproof enclosure and a racking system for the EV battery packs. FIG. 4 illustrates an embodiment of the enclosure, which can include fixed and removable exterior insulated panels 60. The enclosure 50 can be designed, for example, as a cabinet where the battery system and system controls are accessible from outside the enclosure, and the enclosure or cabinet is not an occupiable space as defined in building or fire codes. In accordance with an exemplary embodiment, the enclosure 50 is an outdoor rated enclosure that enables outdoor deployment of the energy storage assembly.

In accordance with an exemplary embodiment, the racking system 40 can be fabricated from structural steel and configured to hold EV battery packs 110 (packs 1 through 24). Each pack 110 in the present build of the EV pack storage system (EPS), for example, can weigh in excess of 600 pounds. The side panels 60 of the enclosure 50 can be removed, for example, to allow forklift access to easily install and remove EV battery packs 1 through 24. In addition, the racking system 40 is designed to allow airflow between the EV battery packs. For example, each EV battery pack 110 can be electrically isolated from the racking system 40 by standoffs 30. The EV battery packs 110, for example, can be cooled and heated by a thermal management system 151 under the direction of cabinet control system 150. The thermal management system 151 may include cooling, dehumidification, and other environmental controls as a means for extending the useful lifetime of the EV battery packs 110. A hazard detection system 152 can provide alarms to cabinet control system 150 when smoke, gas or temperature conditions outside of an operational range are detected.

The smart combiner 130 and battery pack controller (BPC) 140 functions are described in connection with the FIG. 1 narrative. The smart combiner 130, the BPC 140, the cabinet control system 150, the thermal management system 151 and the hazard detection system 152 are not shown to scale or with specific physical features. In one or more of the smart combiner 130, the BPC 140, the cabinet control system 150, the thermal management system 151 and the hazard detection system 152 can be mounted to the EPS enclosure. In accordance with an exemplary embodiment, the fixed and removable exterior panels 60 of the enclosure 50 may be thermally insulated.

In accordance with an exemplary embodiment, a system and method for improving yields from a plurality of electric vehicle (EV) battery packs 110 with varying state of health (SOH) are disclosed, which can help improve the storing and extracting of energy capacity from the plurality of electric vehicle (EV) battery pack systems 100, 200, 300, 400. As set forth, each of the EV battery packs 110 can be used as is, without modifications. In addition, battery cell module assemblies (CMA) comprising a plurality of cells that are assembled into a battery pack can also be used.

Figure 5:
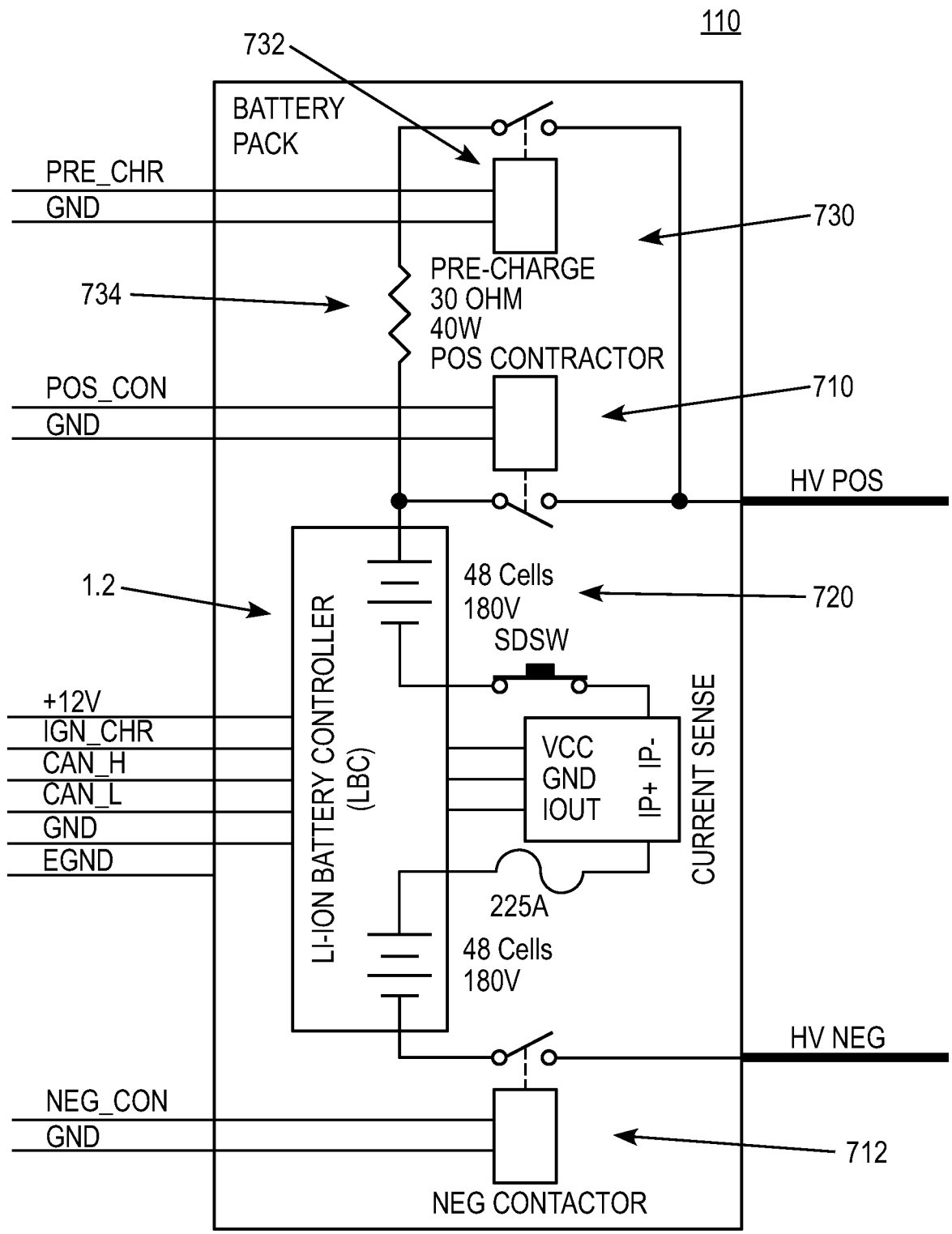
FIG. 5 illustrates an example of internal components of an electric vehicle (EV) battery pack in accordance with an exemplary embodiment.

FIG. 5 illustrates internal components of an EV battery pack 110. In accordance with an exemplary embodiment, each battery pack 110 contains a dedicated Battery Management System (BMS) 1.2, for example, a Li-ion Battery Controller (LBC) that is provided by the manufacturer of the electric vehicle battery pack 110 or installed by an assembler if the electric vehicle battery pack is a battery cell module assembly (CMA). The BMS 1.2 can be configured to monitor the individual cell voltages and temperatures as well as total pack current and voltage and provides a communications method to report this information (for example, to a controller area network (CAN) bus). The BMS 1.2 can also maintain and balance the individual cells 720, either actively or passively. In addition, as set forth above, the BMS 1.2 may also manage cooling/heating of the battery pack 110. Each battery pack 110 can also contain one or more contactors 710, 712, for example, a positive contractor 710 and a negative contractor 712, capable of connecting/disconnecting under load. Each battery pack 110 may also contain one or more pre-chargers 730 (power resistor 732 and relay 734), which can be used to limit current when, for example, contractors are connecting/disconnecting the battery pack 110 under load. In addition, each of the battery packs 110 will also contain all the necessary electrical cables, cell interconnects, fuses, safety disconnects, connectors, components and housings to make them relatively safe to touch and rather easy to assemble into useable batteries (or battery storage systems).

As described above, the battery cabinets 50 can provide a secure weather protected and climate-controlled environment for the battery packs 110. The battery packs 110 can be loaded and secured into cabinets 50 and wired into a series/parallel matrix to form a battery. The battery packs 110 can be wired in series up to maximum working voltage of the inverter/DC-DC converter, which can result in two or more battery packs in series (2s, 3s, 4s . . . Ns). In accordance with an exemplary embodiment, any number of battery packs can be wired in parallel (2p, 3p, 4p . . . Np) to get the desired battery storage capacity. For example, FIG. 6 illustrates a battery matrix (e.g., a 3s8p matrix) comprising eight (8) series strings wired in parallel, and wherein each of the series strings of batteries comprises three (3) battery packs 110.

Figure 6:
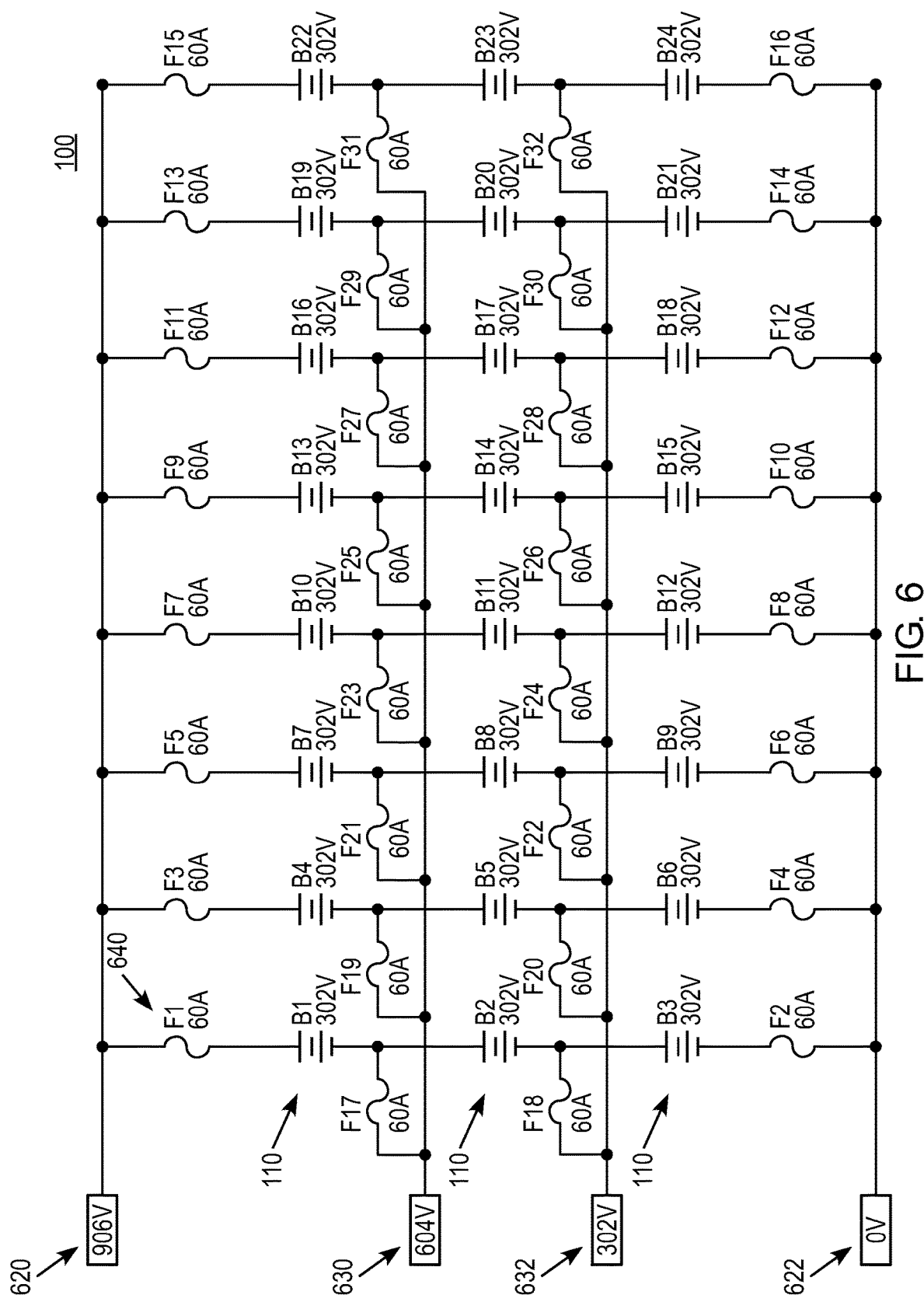
FIG. 6 illustrates an example of an energy storage system having three (3) electric vehicle battery packs coupled in a series string and eight (8) series strings of electric vehicle battery packs connected in parallel in accordance with an exemplary embodiment.

As shown in FIG. 6, each battery pack 110 can be individually wired and fused to form a positive rail 620 and negative rail 622, along with intermediate rails 630, 632 at the locations of each parallel battery connection (typically called a "center tap" in 2s configurations), there will be Ns−1 intermediate rails. For example, for a series string having three battery packs, the number of intermediate rails 630, 632 will be two (2). The intermediate rails 630, 632 can be used for series voltage balancing. In FIG. 6, fuses 1-32 610, for example, can be in the combiner box (or smart combiner) 130 (FIG. 3), which is attached, for example, to the side of the cabinet 50. For example, the fuses 1-32 640 can be sized to protect the wiring and the fuses should be rated more than the max charge/discharge current that the battery packs 110 will be exposed to in the matrix configuration of the electric vehicle battery pack storage system 100. The combiner box 130 can also contain the main disconnect and main fuses for the cabinet 50.

In accordance with an embodiment, internal to each battery pack 110 can be a cell balancer, which cell balancer can be either passive (resistive) or active (uses inductors or capacitors to store and move charge). These internal balancers will maintain the cell voltages to be within, for example, a few millivolts (mV) of each other.

Figure 7:
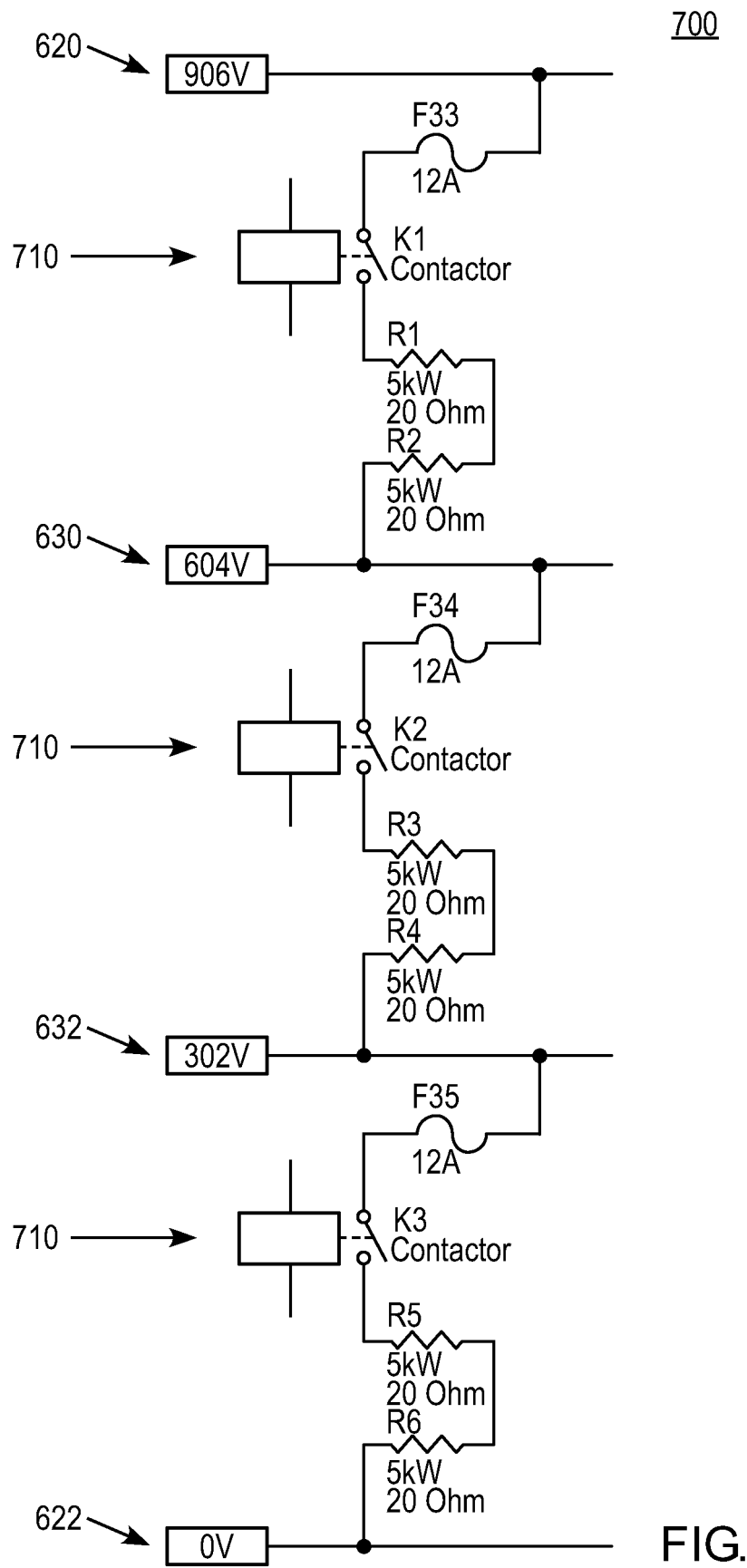
FIG. 7 illustrates an example of an external passive balancer for three (3) elective vehicle battery packs arranged in a series string in accordance with an exemplary embodiment.
Figure 8:
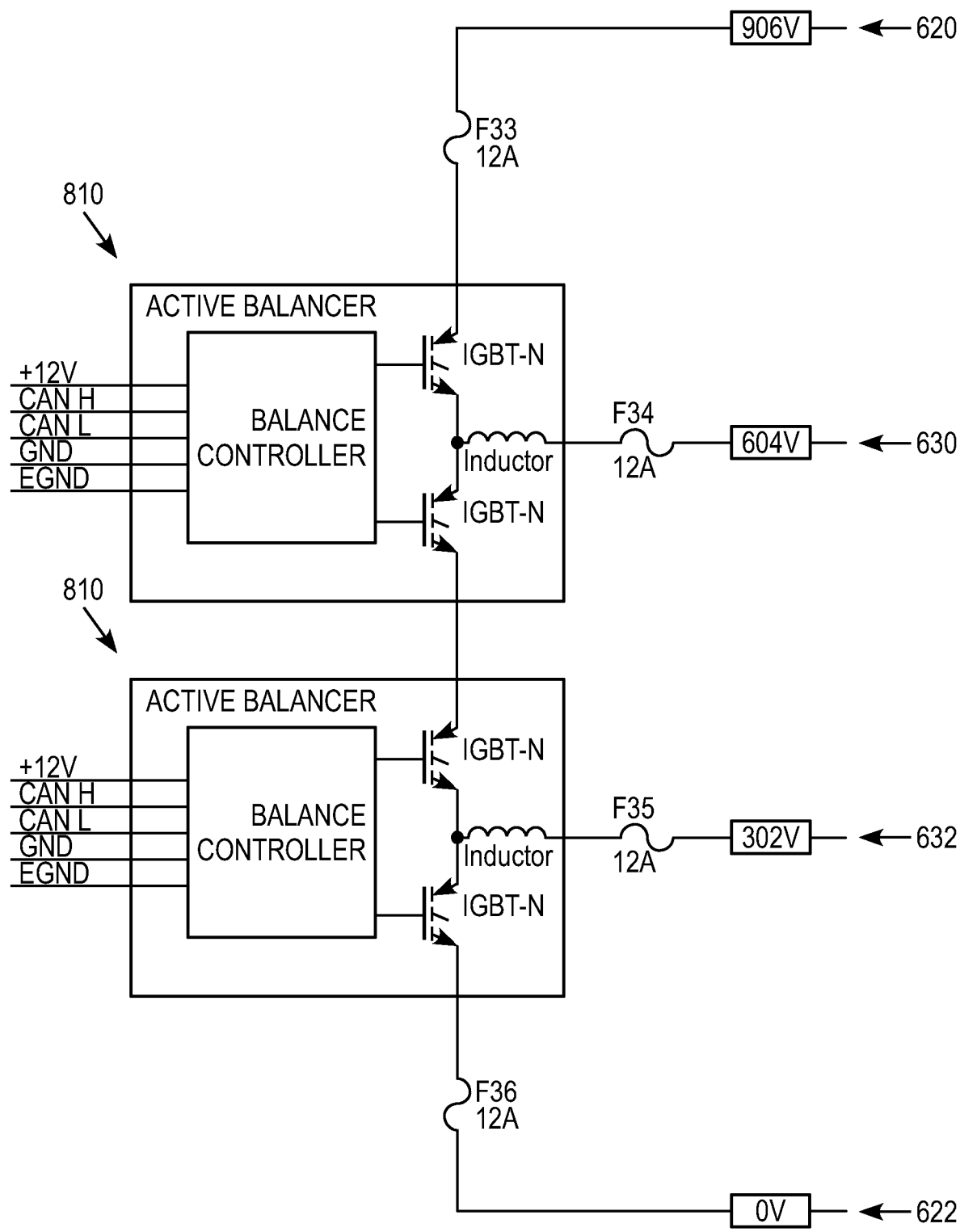
FIG. 8 illustrates an example of an external active balancer for three (3) elective vehicle battery packs arranged in a series string in accordance with an exemplary embodiment.

In addition to the internal cell balancers, as shown in FIGS. 7 and 8, the system can include an external string balancer system 700, 800. The external string balancer system 700, 800 can be integrated into and/or attached to the combiner 130 and can be, for example, a passive balancer (resistive) 710, or an active balancer 810 that uses inductors or capacitors to store and move charge). In accordance with an exemplary embodiment, the external string balancer 700, 800 can maintain, for example, the intermediate rails 630, 632 at the same voltage.

In accordance with an exemplary embodiment, the battery pack controller (BPC) 140 can include two active components, a pack interface (PI) card 141 and pack controller (PC) card (or control circuit) 142 as shown in FIG. 3. In addition, the BPC 140 can include a passive back plane for communications between the pack interface card (PI) 141 and the pack controller (PC) card (or control circuit) 142. The BPC 140 can be configured to communicate directly with the battery packs 110 and can include the inputs/outputs (I/O) to enable and charge/discharge the battery packs 110. Each BPC 140 may communicate and control one or more battery packs 110. The BPC 140 can have different communications methods and I/O as needed to interface with different manufacture of battery packs 110. The BPC 140 can also simulate other components in the vehicle that may be required for the battery pack 110 to be enabled. For example, the BPC 140 can gather all the data available from the battery pack 110 and store the data into a battery pack data structure. For example, the battery pack data structure can be unique to each manufacture of battery pack. In accordance with an embodiment, the battery pack data structure can capture constant data sampled once on startup, which can include, for example, battery pack make, model, serial number, etc. In addition, real time data can be sampled at a set interval, for example, during a set time-period, for example, every second, two seconds, etc. The real time data can include, for example, cell voltages, temperatures, pack voltage, current, state of charge (SOC), state of heath (SOH), status, trouble codes, etc.

In accordance with an exemplary embodiment, the pack interface (PI) 141 can monitor the pack data and can set warnings or faults if the values are out of the expected ranges. For example, if there is a critical fault, or loss of communications, the battery pack 110 can be disabled by the BPC 140.

In accordance with an exemplary embodiment, the BPC 140 communicates with each pack interface (e.g., battery management system (BMS) 1.2) over a passive backplane and obtains a generic subset of the pack real time data. The pack real time data can be a condensed subset of data that can contain minimum and/or maximum cell voltages, temperatures and locations, pack voltage, current, state of charge (SOC), state of health (SOH), status warning and faults, etc. In accordance with an example, the BPC 140 can also monitor the pack data and sets any warnings or faults if the values are out of the expected ranges. If there is a critical fault, or loss of communications, the battery pack 110 can be disabled by the BPC 140.

In addition, the BPC 140 can communicate to the supervisory control and data acquisition (SCADA) systems 501 over a native protocol of the BPC 140, for example, over a TCP/IP Modbus. The BPC 140 can also communicate and coordinate with other battery pack controllers (BPCs) 140, for example, a pack interface of the battery management system (BMS) 1.2, connected to the same inverter/DC-DC converter. The BPC 140 commands each pack interface to enable/disable the battery packs 110 to connect/disconnect them from a battery matrix 100 as needed, for example, as set by a matrix algorithm.

In accordance with an embodiment, the EV battery packs 110 can be connected and disconnected under load. For example, the pre-charge resistor 730 (FIG. 5) can be used to limit current before a pack 110 is connected or disconnected. When the pack Interface 141 receives a command to connect a pack 110, the negative contactor is closed 712, next the pre-charge resistor relay 730 is closed, then the positive contactor 710 is closed, finally the pre-charge resistor relay 730 is opened. When the pack interface 141 receives a command to disconnect a pack 110. The pre-charge resistor relay 730 is closed, next the positive contactor 710 is opened, then the pre-charge resistor relay 730 is opened, finally the negative contactor 712 is opened.

In accordance with an exemplary embodiment, the BPC 140 can be commanded to connect the lowest voltage packs 110 (for example, to begin charging), connect highest voltage packs 110 (for example, to begin discharging), or connect a plurality of packs 110, (for example, to connect as many packs 110 as possible for charge or discharge). When commanded to connect the lowest voltage packs 110, a matrix algorithm is configured to locate the lowest voltage packs 110 to form a series string of battery packs 110. The series string of battery packs, for example, two battery packs in series (2s), three battery packs in series (3s), four battery packs in series (4s) . . . Ns number of packs 110 can be told to connect, if successful this will become the first connected string. If one or more of the battery packs 110 faulted, another attempt will be made with the next lowest voltage non-faulted packs. Next, the SCADA system 501 is enabled to charge the connected string, and wherein the charge current will be limited to the maximum programmed pack current.

In accordance with an exemplary embodiment, as the first series string starts to charge, the voltage of the connected packs 110 will begin to rise. When the voltage of one or more of the packs 110 of the first series string is within a programmed voltage connection window of the disconnected packs 110, the BPC 140 can enable one or more of the packs 110 to connect in parallel with the packs in the first series string having a detected voltage within the programmed voltage connection window of the disconnected packs. The pack interface 141 will then connect the packs 110 as instructed. As the packs 110 charge and the voltage rises, more disconnected packs 110 will match the programmed voltage connection window and connect. As more packs 110 are connected, the BPC 140 will adjust the SCADA 501 charge current to stay below the maximum programmed pack current. In accordance with an exemplary embodiment, eventually all non-faulted packs 110, for example, in the matrix 600 will be connected.

In accordance with an exemplary embodiment, the BPC 140 can be commanded to connect the highest voltage packs 110, the matrix algorithm will find the highest voltage packs to make a series string. For example, the series strings can be two voltage packs in series (2s), three voltage packs in series (3s), four voltage packs in series (4s) . . . Ns number of packs 110. The series strings of battery packs 110 can be instructed or programmed to connect, if successful this will become the first connected string of higher voltage packs. If one or more of the higher voltage packs faulted, another attempt will be made with the next highest voltage non-faulted packs 110 from the higher voltage packs 110. Next the SCADA system 501 can be enabled to discharge the connected series string, and wherein the discharge current will be limited to the maximum programmed pack current.

In accordance with an exemplary embodiment, as the first string of higher voltage packs 110 starts to discharge, the voltage of the connected packs 110 will begin to drop. When the voltage of one or more of the battery packs 110 is within the programmed voltage connection window of the disconnected packs 110, the BPC 140 will enable the one or more packs 110 with a voltage within the programmed voltage connection window to connect. The BPC 140 will then connect the battery packs 110 as instructed. As the battery packs 110 discharge and the voltage drops, more disconnected battery packs 110 will match the programmed voltage connection window and connect. As more battery packs are connected, the BPC 140 will adjust the SCADA 501 discharge current to stay below the maximum programmed pack current. In accordance with an exemplary embodiment, eventually all non-faulted packs in the matrix 600 can be connected.

In accordance with an exemplary embodiment, when commanded to connect the plurality of battery packs 110 that form a majority of the battery packs 110 that are within a programmed voltage connection window, the matrix algorithm can calculate a histogram of the plurality of battery packs 110 with binning determined by the programmed voltage connection window (e.g., the plurality of battery packs 110 with majority voltages that are within the programmed voltage connection window). The matrix algorithm can then make one or more series strings of the battery packs with the majority voltages, each of the one or more series strings having two or more battery packs in series (2s), three or more battery packs in series (3s), four or more battery packs in series (4s) . . . Ns number of packs, which number of battery packs can be connect, and if successful, the battery packs 100 will become the first connected string. If one or more packs faulted, another attempt will be made with the other binned non-faulted packs 110. The remaining packs 110 within the programmed voltage connection window will be instructed to connect.

Next, the SCADA system 501 can be enabled to charge or discharge the connected series string, the charge/discharge current will be limited to the maximum programmed pack current. When any pack voltage gets within the programmed voltage connection window of the disconnected packs, the pack controller will enable those packs to connect. The pack interface will then connect the packs 110 as instructed. As more packs are connected, the pack controller will adjust the SCADA 501 charge current to stay below the maximum programmed pack current. In addition, once the battery packs with majority voltages (i.e., a majority of the pacts are within a defined voltage range) have been connected in series, the series strings of electric vehicle battery packs in which the electric vehicle battery packs are within a programmed voltage connection window can be connected in parallel.

In accordance with an exemplary embodiment, due to the variance in battery pack state of health (SOH), capacity and individual cell balance, some battery packs 110 will become fully charged or fully discharge before others. For example, battery packs 110 reaching the maximum programmed cell voltage, and/or maximum state of charge (SOC) will be disconnected allowing the other battery packs 110 in the system to fully charge. Before disconnecting battery packs 110, the SCADA 501 charge current will be reduced as needed to stay below the maximum programmed pack current. While charging, battery packs 110 will eventually disconnect down to a programmed minimum number of connected series strings. The minimum number of connected strings is determined by the minimum inverter/DC-DC converter load. When the discharge begins, battery packs within the programmed voltage connection window will be instructed to connect and the discharge current will be limited to the maximum programmed pack current.

In accordance with an exemplary embodiment, EV battery packs 100, 200, 300, 400 reaching the minimum programmed cell voltage, and/or minimum state of charge (SOC) will be disconnected allowing the other battery packs 110 in the system to fully discharge. Before disconnecting packs 110, the SCADA 501 discharge current will be reduced as needed to stay below the maximum programmed pack current. While discharging, battery packs 110 will eventually disconnect down to a programmed minimum number of connected strings. For example, the minimum number of connected strings is determined by the minimum inverter/DC-DC converter load. When the charge begins, battery packs 110 within the programmed voltage connection window will be instructed to connect and the discharge charge will be limited to the maximum programmed pack current.

FIG. 9 illustrates a method 900 for integrating electric vehicle battery packs into an integrated battery energy storage system. As shown in FIG. 9, the method includes coupling a plurality of electric vehicle battery packs in a series/parallel arrangement, the series/parallel arrangement including a plurality of series strings of electric vehicle battery packs, each of the plurality of series strings of electric vehicle battery packs includes at least two of the plurality of electric vehicle battery packs coupled in series, and wherein the plurality of series strings of electric vehicle battery packs are connected in parallel 910. In addition, the coupling of the plurality of electric vehicle battery packs comprises one or more of connecting electric vehicle battery packs with lower voltages in series, connecting electric vehicle battery packs with higher voltages in series, connecting electric vehicle battery packs with majority voltages in series, and connecting any other electric vehicle battery packs within a programmed voltage connection window in parallel 920.

In accordance with an exemplary embodiment, the method can further include connecting the electric vehicle battery packs with lower voltages in series as at least a lower voltage series string; and charging the lower voltage series string to a maximum programmed pack current. In addition, wherein one or more of the electric vehicle battery packs with the lower voltages is faulted, further comprising: connecting one or more electric vehicle battery packs with a next lowest voltage to the lower voltage series string in place of the one or more the electric vehicle battery. The method can also include charging one or more of the electric vehicle battery packs connected in the lower voltage series string to a maximum programmed pack current of one or more disconnected electric vehicle battery packs; connecting in parallel one or more of the electric vehicle battery packs within a programmed voltage connection window of disconnected electric vehicle battery packs; and connecting one or more of the disconnected electric vehicle battery packs that are within the programmed voltage connection window of the disconnected electric vehicle battery packs to each other in one or more series strings.

In accordance with another exemplary embodiment, the method includes connecting the electric vehicle battery packs with higher voltages in series as a higher voltage series string; and discharging the higher voltage series string to a maximum programmed pack current. In addition, wherein one or more of the electric vehicle battery packs with the higher voltages is faulted, the method further includes: connecting one or more electric vehicle battery packs with a next highest voltage to the higher voltage series string in place of the one or more the electric vehicle battery packs with the higher voltages that is faulted. The method can also include discharging one or more of the electric vehicle battery packs connected in the higher voltage series string to a maximum programmed pack current of one or more disconnected electric vehicle battery packs; connecting in parallel one or more of the electric vehicle battery packs within a programmed voltage connection window of disconnected electric vehicle battery packs; and connecting one or more of the disconnected electric vehicle battery packs that are within the programmed voltage connection window of the disconnected electric vehicle battery packs to each other in one or more series strings.

In accordance with an exemplary embodiment, the method can further include connecting the electric vehicle battery packs in series/parallel within the programmed voltage connection window by calculating a histogram of the electric vehicle battery packs with binning determined by the programmed voltage window; and limiting charge or discharge current of the electric vehicle battery packs connected in series to a maximum programmed pack current. In addition, the method further includes disconnecting charged electric vehicle battery packs at an end of a charge cycle from the electric vehicle battery packs with lower voltages connected in series, the end of the charge cycle being based on one or more of a state of charge (SOC) or a cell voltage of the charged electric vehicle battery packs; and disconnecting discharged electric vehicle battery packs at an end of a discharge cycle from the electric vehicle battery packs with higher voltages connected in series, the end of the discharge cycle being based on a state of charge (SOC) or a cell voltage of the discharged electric vehicle battery packs.

Figure 10:
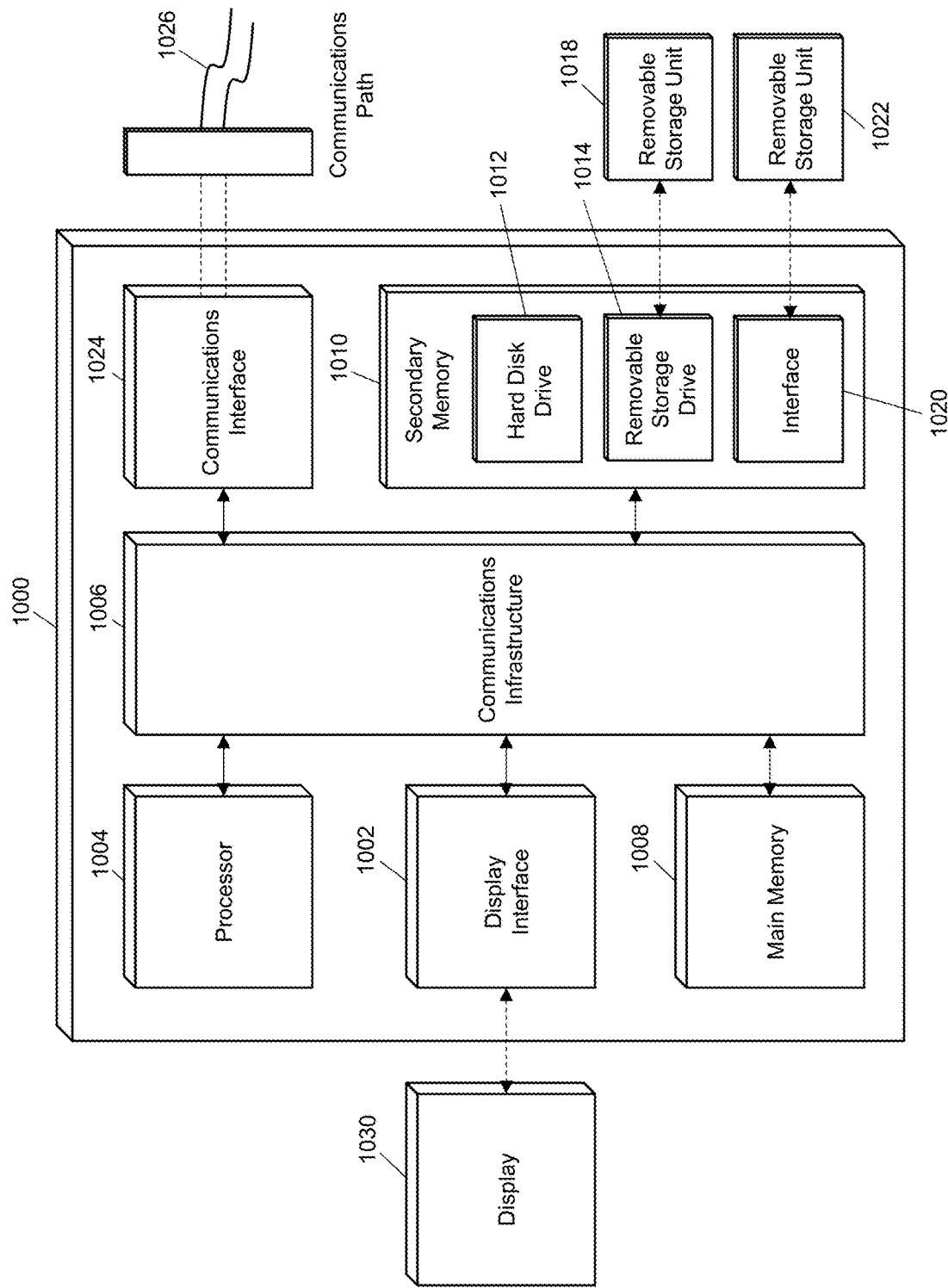
FIG. 10 illustrates an exemplary hardware architecture for an embodiment of a computer system.

FIG. 10 illustrates a representative computer system 1000 in which embodiments of the present disclosure, or portions thereof, may be implemented as computer-readable code executed on hardware. For example, the BPC 140, the SCADA 501, and the power system manager 503 may be implemented in whole or in part by a computer system 1000 using hardware, software executed on hardware, firmware, non-transitory computer readable media having instructions stored thereon, or a combination thereof and may be implemented in one or more computer systems or other processing systems. Hardware, software executed on hardware, or any combination thereof may embody modules and components used to implement the methods and steps of the presently described method and system.

If programmable logic is used, such logic may execute on a commercially available processing platform configured by executable software code to become a specific purpose computer or a special purpose device (for example, programmable logic array, application-specific integrated circuit, etc.). A person having ordinary skill in the art may appreciate that embodiments of the disclosed subject matter can be practiced with various computer system configurations, including multi-core multiprocessor systems, mini-computers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 1018, a removable storage unit 1022, and a hard disk installed in hard disk drive 1012.

Various embodiments of the present disclosure are described in terms of this representative computer system 1000. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

A processor device 1004 may be processor device specifically configured to perform the functions discussed herein. The processor device 1004 may be connected to a communications infrastructure 1006, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 1000 may also include a main memory 1008 (e.g., random access memory, read-only memory, etc.), and may also include a secondary memory 1010. The secondary memory 1010 may include the hard disk drive 1012 and a removable storage drive 1014, such as a floppy disk drive, a magnetic tape drive, an optical disk drive, a flash memory, etc.

The removable storage drive 1014 may read from and/or write to the removable storage unit 1018 in a well-known manner. The removable storage unit 1018 may include a removable storage media that may be read by and written to by the removable storage drive 1014. For example, if the removable storage drive 1014 is a floppy disk drive or universal serial bus port, the removable storage unit 1018 may be a floppy disk or portable flash drive, respectively. In one embodiment, the removable storage unit 1018 may be non-transitory computer readable recording media.

In some embodiments, the secondary memory 1010 may include alternative means for allowing computer programs or other instructions to be loaded into the computer system 1000, for example, the removable storage unit 1022 and an interface 1020. Examples of such means may include a program cartridge and cartridge interface (e.g., as found in video game systems), a removable memory chip (e.g., EEPROM, PROM, etc.) and associated socket, and other removable storage units 1022 and interfaces 1020 as will be apparent to persons having skill in the relevant art.

Data stored in the computer system 1000 (e.g., in the main memory 1008 and/or the secondary memory 1010) may be stored on any type of suitable computer readable media, such as optical storage (e.g., a compact disc, digital versatile disc, Blu-ray disc, etc.) or magnetic storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 1000 may also include a communications interface 1024. The communications interface 1024 may be configured to allow software and data to be transferred between the computer system 1000 and external devices. Exemplary communications interfaces 1024 may include a modem, a network interface (e.g., an Ethernet card), a communications port, a PCMCIA slot and card, etc. Software and data transferred via the communications interface 1024 may be in the form of signals, which may be electronic, electromagnetic, optical, or other signals as will be apparent to persons having skill in the relevant art. The signals may travel via a communications path 1026, which may be configured to carry the signals and may be implemented using wire, cable, fiber optics, a phone line, a cellular phone link, a radio frequency link, etc.

The computer system 1000 may further include a display interface 1002. The display interface 1002 may be configured to allow data to be transferred between the computer system 1000 and external display 1030. Exemplary display interfaces 1002 may include high-definition multimedia interface (HDMI), digital visual interface (DVI), video graphics array (VGA), etc. The display 1030 may be any suitable type of display for displaying data transmitted via the display interface 1002 of the computer system 1000, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 1008 and secondary memory 1010, which may be memory semiconductors (e.g., DRAMs, etc.). These computer program products may be means for providing software to the computer system 1000. Computer programs (e.g., computer control logic) may be stored in the main memory 1008 and/or the secondary memory 1010. Computer programs may also be received via the communications interface 1024. Such computer programs, when executed, may enable computer system 1000 to implement the present methods as discussed herein. In particular, the computer programs, when executed, may enable processor device 1004 to implement the methods illustrated by FIGS. 1-9, as discussed herein. Accordingly, such computer programs may represent controllers of the computer system 1000. Where the present disclosure is implemented using software executed on hardware, the software may be stored in a computer program product and loaded into the computer system 1000 using the removable storage drive 1014, interface 1020, and hard disk drive 1012, or communications interface 1024.

The processor device 1004 may comprise one or more modules or engines configured to perform the functions of the computer system 1000. Each of the modules or engines may be implemented using hardware and, in some instances, may also utilize software executed on hardware, such as corresponding to program code and/or programs stored in the main memory 1008 or secondary memory 1010. In such instances, program code may be compiled by the processor device 1004 (e.g., by a compiling module or engine) prior to execution by the hardware of the computer system 1000. For example, the program code may be source code written in a programming language that is translated into a lower level language, such as assembly language or machine code, for execution by the processor device 1004 and/or any additional hardware components of the computer system 1000. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 1000 to perform the functions disclosed herein. It will be apparent to persons having skill in the relevant art that such processes result in the computer system 1000 being a specially configured computer system 1000 uniquely programmed to perform the functions discussed above.

Techniques consistent with the present disclosure provide, among other features, an energy storage system and method employing second-life electric vehicle batteries. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. An integrated battery energy storage system, the integrated battery energy system comprising:
 a plurality of electric vehicle battery packs; and
 a computer system, the computer system including a processor configured to:
  couple the plurality of electric vehicle battery packs in a series/parallel arrangement, the series/parallel arrangement including a plurality of series strings of electric vehicle battery packs, each of the plurality of series strings of electric vehicle battery packs includes at least two of the plurality of electric vehicle battery packs coupled in series, and wherein the plurality of series strings of electric vehicle battery packs are connected in parallel; and wherein the coupling of the plurality of electric vehicle battery packs includes one or more of connecting electric vehicle battery packs with lower voltages in series, connecting electric vehicle battery packs with higher voltages in series, connecting electric vehicle battery packs with majority voltages in series, and connecting electric vehicle battery packs within a programmed voltage connection window in parallel.

2. The integrated battery energy storage system according to claim 1, wherein the processor is configured to:
connect the electric vehicle battery packs with lower voltages in series as at least a lower voltage series string; and
charge the lower voltage series string to a maximum programmed pack current.

3. The integrated battery energy storage system according to claim 2, wherein one or more of the electric vehicle battery packs with the lower voltages is faulted, the processor is configured to:
connect one or more electric vehicle battery packs with a next lowest voltage to the lower voltage series string in place of the one or more the electric vehicle battery packs with the lower voltages that is faulted.

4. The integrated battery energy storage system according to claim 2, wherein the processor is configured to:
charge one or more of the electric vehicle battery packs connected in the lower voltage series string to a maximum programmed pack current of one or more disconnected electric vehicle battery packs;
connect in parallel one or more of the electric vehicle battery packs within a programmed voltage connection window of disconnected electric vehicle battery packs; and
connect one or more of the disconnected electric vehicle battery packs that are within the programmed voltage connection window of the disconnected electric vehicle battery packs to each other in one or more series strings.

5. The integrated battery energy storage system according to claim 1, wherein the processor is configured to:
connect the electric vehicle battery packs with higher voltages in series as a higher voltage series string; and
discharge the higher voltage series string to a maximum programmed pack current.

6. The integrated battery energy storage system according to claim 5, wherein one or more of the electric vehicle battery packs with the higher voltages is faulted, the processor is configured to:
connect one or more electric vehicle battery packs with a next highest voltage to the higher voltage series string in place of the one or more the electric vehicle battery packs with the higher voltages that is faulted.

7. The integrated battery energy storage system according to claim 5, wherein the processor is configured to:
discharge one or more of the electric vehicle battery packs connected in the higher voltage series string to a maximum programmed pack current of one or more disconnected electric vehicle battery packs;
connect in parallel one or more of the electric vehicle battery packs within a programmed voltage connection window of disconnected electric vehicle battery packs; and
connect one or more of the disconnected electric vehicle battery packs that are within the programmed voltage connection window of the disconnected electric vehicle battery packs to each other in one or more series strings.

8. The integrated battery energy storage system according to claim 1, wherein the processor is configured to:
connect the electric vehicle battery packs in series/parallel within the programmed voltage connection window by calculating a histogram of the electric vehicle battery packs with binning determined by the programmed voltage window; and
limit charge or discharge current of the electric vehicle battery packs connected in series to a maximum programmed pack current.

9. The integrated battery energy storage system according to claim 1, wherein the processor is configured to:
disconnect charged electric vehicle battery packs at an end of a charge cycle from the electric vehicle battery packs with lower voltages connected in series, the end of the charge cycle being based on one or more of a state of charge (SOC) or a cell voltage of the charged electric vehicle battery packs; and
disconnect discharged electric vehicle battery packs at an end of a discharge cycle from the electric vehicle battery packs with higher voltages connected in series, the end of the discharge cycle being based on a state of charge (SOC) or a cell voltage of the discharged electric vehicle battery packs.

10. The integrated battery energy storage system according to claim 1, further comprising:
an external cell balancer, the external cell balancer configured to maintain one or more intermediate rails of the plurality of electric vehicle battery packs coupled in the series/parallel arrangement at a same voltage;
a circuit combiner comprising an overcurrent device in series with each of the plurality series strings; and
a smart combiner comprising a plurality of DC-to-DC converters configured to balance two or more electric vehicle battery packs in a common series string by moving energy from an electric vehicle battery pack to another electrical vehicle battery pack in a common series string or by moving energy to an electric vehicle battery pack from another electrical vehicle battery pack in a common series string.

11. The integrated battery energy storage system according to claim 1, further comprising:
a battery pack controller configured to communicate with and control a battery management system within each of the plurality of electric vehicle battery packs; and
a bidirectional power converter configured to convert DC electric vehicle battery pack power to AC electrical grid power or to convert AC electrical grid power to charge DC electric vehicle battery packs.

12. A method for integrating electric vehicle battery packs into an integrated battery energy storage system, the method comprising:
coupling a plurality of electric vehicle battery packs in a series/parallel arrangement, the series/parallel arrangement including a plurality of series strings of electric vehicle battery packs, each of the plurality of series strings of electric vehicle battery packs includes at least two of the plurality of electric vehicle battery packs coupled in series, and wherein the plurality of series strings of electric vehicle battery packs are connected in parallel; and wherein the coupling of the plurality of electric vehicle battery packs comprises one or more of connecting electric vehicle battery packs with lower voltages in series, connecting electric vehicle battery packs with higher voltages in series, connecting electric vehicle battery packs with majority voltages in series, and connecting electric vehicle battery packs within a programmed voltage connection window in parallel.

13. The method according to claim 12, further comprising:
    connecting the electric vehicle battery packs with lower voltages in series as at least a lower voltage series string; and
    charging the lower voltage series string to a maximum programmed pack current.

14. The method according to claim 13, wherein one or more of the electric vehicle battery packs with the lower voltages is faulted, further comprising:
    connecting one or more electric vehicle battery packs with a next lowest voltage to the lower voltage series string in place of the one or more the electric vehicle battery packs with the lower voltages that is faulted.

15. The method according to claim 13, further comprising:
    charging one or more of the electric vehicle battery packs connected in the lower voltage series string to a maximum programmed pack current of one or more disconnected electric vehicle battery packs;
    connecting in parallel one or more of the electric vehicle battery packs within a programmed voltage connection window of disconnected electric vehicle battery packs; and
    connecting one or more of the disconnected electric vehicle battery packs that are within the programmed voltage connection window of the disconnected electric vehicle battery packs to each other in one or more series strings.

16. The method according to claim 12, further comprising:
    connecting the electric vehicle battery packs with higher voltages in series as a higher voltage series string; and
    discharging the higher voltage series string to a maximum programmed pack current.

17. The method according to claim 16, wherein one or more of the electric vehicle battery packs with the higher voltages is faulted, further comprising:
    connecting one or more electric vehicle battery packs with a next highest voltage to the higher voltage series string in place of the one or more the electric vehicle battery packs with the higher voltages that is faulted.

18. The method according to claim 16, further comprising:
    discharging one or more of the electric vehicle battery packs connected in the higher voltage series string to a maximum programmed pack current of one or more disconnected electric vehicle battery packs;
    connecting in parallel one or more of the electric vehicle battery packs within a programmed voltage connection window of disconnected electric vehicle battery packs; and
    connecting one or more of the disconnected electric vehicle battery packs that are within the programmed voltage connection window of the disconnected electric vehicle battery packs to each other in one or more series strings.

19. The method according to claim 12, further comprising:
    connecting the electric vehicle battery packs in series/parallel within the programmed voltage connection window by calculating a histogram of the electric vehicle battery packs with binning determined by the programmed voltage window; and
    limiting charge or discharge current of the electric vehicle battery packs connected in series to a maximum programmed pack current.

20. The method according to claim 12, further comprising:
    disconnecting charged electric vehicle battery packs at an end of a charge cycle from the electric vehicle battery packs with lower voltages connected in series, the end of the charge cycle being based on one or more of a state of charge (SOC) or a cell voltage of the charged electric vehicle battery packs; and
    disconnecting discharged electric vehicle battery packs at an end of a discharge cycle from the electric vehicle battery packs with higher voltages connected in series, the end of the discharge cycle being based on a state of charge (SOC) or a cell voltage of the discharged electric vehicle battery packs.

* * * * *